(12) United States Patent
Kagawa

(10) Patent No.: US 7,145,693 B2
(45) Date of Patent: Dec. 5, 2006

(54) IMAGE PROCESSING APPARATUS AND METHOD

(75) Inventor: Hidetsugu Kagawa, Ibaraki (JP)

(73) Assignee: Canon Kabushiki Kaisha, Tokyo (JP)

(*) Notice: Subject to any disclaimer, the term of this patent is extended or adjusted under 35 U.S.C. 154(b) by 1096 days.

(21) Appl. No.: 10/212,156

(22) Filed: Aug. 6, 2002

(65) Prior Publication Data

US 2003/0030829 A1 Feb. 13, 2003

(30) Foreign Application Priority Data

Aug. 8, 2001 (JP) ............... 2001-241358

(51) Int. Cl.
*G06F 15/00* (2006.01)

(52) U.S. Cl. ............ 358/1.9; 358/3.22; 358/465; 358/466; 358/501; 358/502; 358/503; 358/509; 358/530; 382/162; 382/167; 382/270; 382/271

(58) Field of Classification Search .......... 358/1.9, 358/3.22, 465, 466, 501, 502, 503, 509, 530; 382/162, 167, 270, 271
See application file for complete search history.

(56) References Cited

U.S. PATENT DOCUMENTS 5,608,549 A * 3/1997 Usami .................. 358/530
6,842,541 B1 * 1/2005 Curry .................. 382/270

FOREIGN PATENT DOCUMENTS

| JP | 08-256271 A | 10/1996 |
| JP | 11-127305 A | 5/1999 |
| JP | 2000-165685 A | 6/2000 |

* cited by examiner

*Primary Examiner*—Twyler Lamb
*Assistant Examiner*—Vu B. Hang
(74) *Attorney, Agent, or Firm*—Fitzpatrick, Cella, Harper & Scinto

(57) ABSTRACT

In ink-jet printing apparatuses having a monochrome head which is longer than a color head, if a monochrome image is processed as a color image, the printing speed cannot be improved. Accordingly, the color attribute is determined by pixel based on a luminance signal indicating a color multi-value image, and the number of color attributes and the number of array attributes in a first line group are counted. Based on these count values, a parameter indicating an image characteristic of second line group including the first line group is calculated. The image attribute of the second line group is determined in correspondence with the respective count values and the parameter. Then, based on the results of determination about adjacent second line groups, the image attribute of third line group included in the second line groups is determined. Thus attribute determination can be appropriately performed in predetermined band units of image data.

16 Claims, 7 Drawing Sheets

IMAGE PROCESSING APPARATUS AND METHOD

FIELD OF THE INVENTION

The present invention relates to an image processing apparatus and method, and more particularly, to an image processing apparatus and method for determining an attribute of color image data by predetermined lines.

BACKGROUND OF THE INVENTION

In conventional image forming apparatuses, various schemes are employed for improvement in printing speed. For example, in an image forming apparatus using an ink-jet method in its printing unit, a black (Bk) printhead has a length longer than that of a color printhead such that the black printhead can perform printing in a wider printing range, thereby the printing speed is increased.

However, in the above-described conventional ink-jet image forming apparatus, although the printing speed in monochrome image printing has been improved by a longer Bk head, the printing speed in color printing has not been especially changed. Accordingly, if a monochrome image is processed as a color image, the printing speed is not improved.

Further, in a case where color image duplication is performed by an image forming apparatus having an original reading unit, if a monochrome image including characters or the like is processed as a color image due to color shift upon reading, printing is performed by using color ink or the like, thus pure monochrome printing cannot be performed.

SUMMARY OF THE INVENTION

The present invention has been proposed to solve the conventional problems, and has its object to provide an image processing apparatus and its method which performs appropriate attribute determination by predetermined band of image data, with a simple construction.

Further, another object of the present invention is to provide an image forming apparatus which enables high-quality image formation by appropriate attribute determination by predetermined band of image data.

As one means for attaining the above objects, the image processing apparatus of the present invention has the following construction.

According to one aspect of the invention is provided an image processing apparatus that comprises means for inputting a luminance signals of pixels which are components of a color multi-value image, and color attribute determination means for determining whether each pixel in the color multi-value image is white, black or color on the basis of a luminance signal of the pixel and outputting a determination result. Storage means store the color attribute of the pixels which are included in two lines in the color multi-value image. First counting means, comprising first, second and third window counting means, are provided in the apparatus. The first window counting means count the number of first windows including a color pixel of interest and at lease one black pixel around the pixel of interest, where each first window has a size of 2×n pixels set on the two lines. The second window counting means count the number of second windows that include no black pixel and that include two color pixels that are continuous in a vertical direction except both end four pixels in the window, where each second window has a size of 2×m (where m>n) pixels set on the two lines, and the third window counting means count the number of third windows, where each third window has only color pixels in the second window. Second counting means count the number of the first, second and third windows in a first band area including a plurality of lines in the color multi-value image. Also provided in the apparatus are calculation means for calculating a parameter indicating an image attribute of a second band area, whose size is two times that of the first band area, on the basis of results provided by the first and second counting means, and attribute determination means determine an image attribute of the second band area on the basis of the results provided by the first and second counting means and the parameter calculated by the calculation means. Final determination means determine an image attribute of a third band area on the basis of the image attributes of two second band areas, where the third band area is an area of overlap of two second band areas and is the same size as the first band area.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Hereinbelow, an embodiment of the present invention will be described in detail with reference to the drawings.

Figure 1:
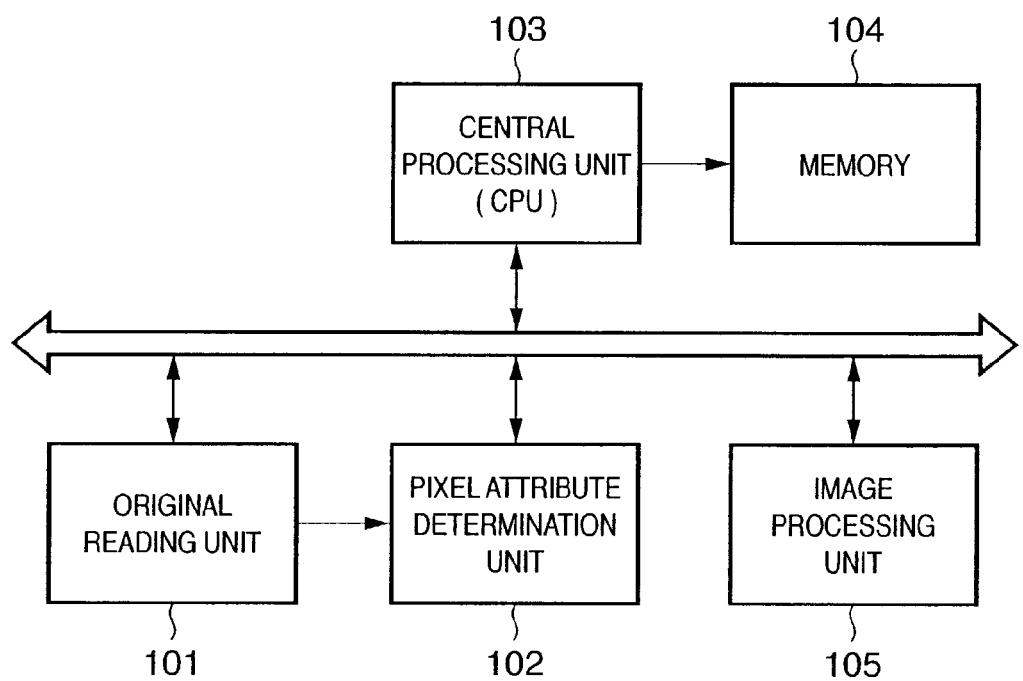
FIG. 1 is a block diagram showing the schematic construction of image processing apparatus according to an embodiment of the present invention.

FIG. 1 is a block diagram showing the construction of an image processing apparatus of the present embodiment. In FIG. 1, reference numeral 101 denotes an original reading unit which reads read (R), green (G) and blue (B) multivalue image data by using a CCD or a contact image sensor; 102, a pixel attribute determination unit which determines an attribute by pixel by comparing color image data read by the original reading unit 101 with predetermined threshold values; 103, a central processing unit (CPU) which controls the overall apparatus via a system bus and performs determination by attribute-based count values counted by the pixel attribute determination unit 102; 104, a memory used upon determination for predetermined lines by the CPU 103;

and 105, an image processing unit which performs high quality image processing based on the result of determination by the CPU 103.

Figure 2:
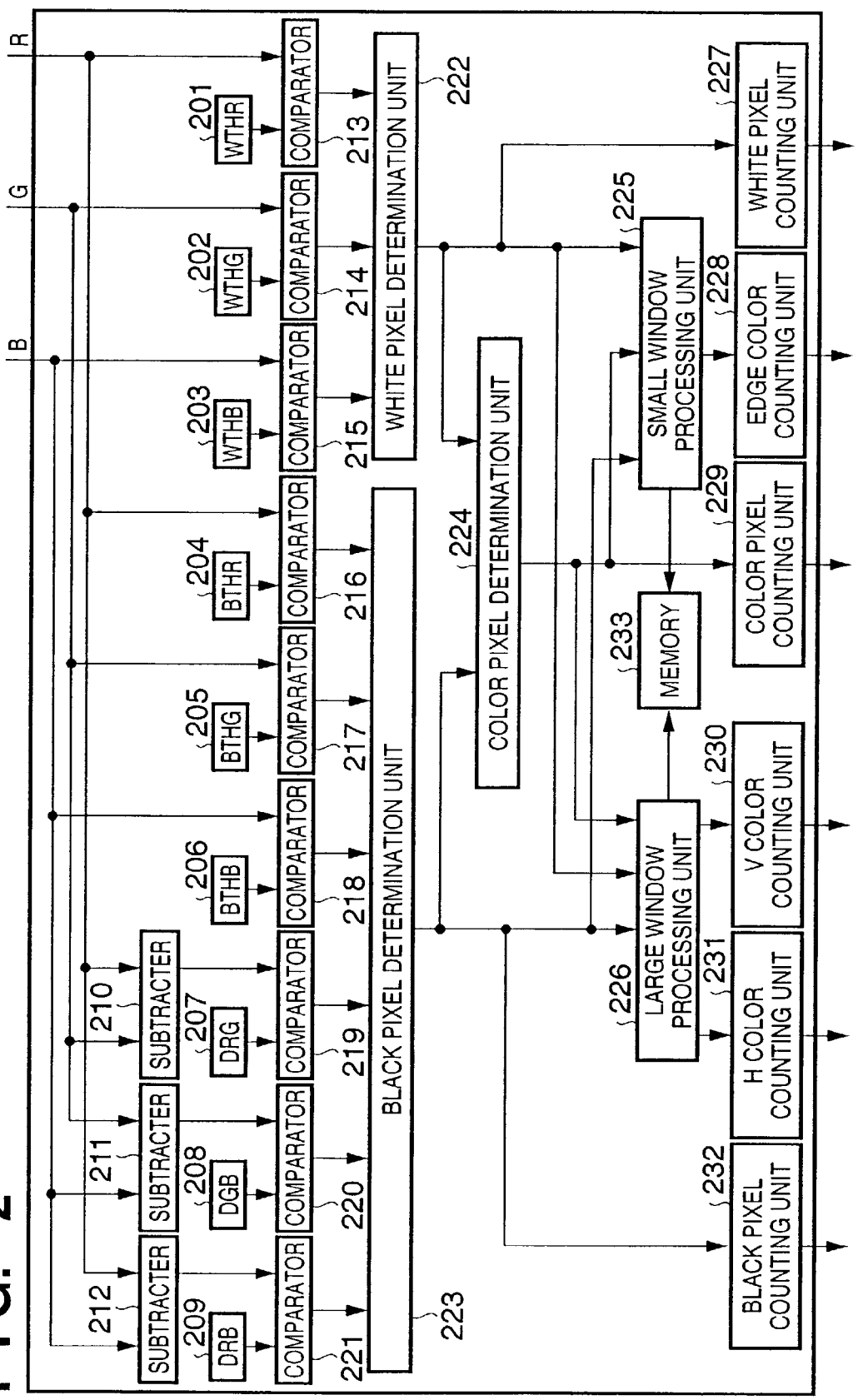
FIG. 2 is a block diagram showing the detailed construction of pixel attribute determination unit.

FIG. 2 is a block diagram showing the detailed construction of the pixel attribute determination unit 102 in FIG. 1. In FIG. 2, numerals 201 to 209 denote registers comprising D flip-flops (DFF) or the like storing parameters necessary for attribute determination about color image data read by the original reading unit 101 by the pixel attribute determination unit 102. Predetermined values are set in these registers by the CPU 103.

More specifically, in the WTHR register 201, the WTHG register 202 and the WTHB register 203, threshold values are set for determination as to whether or not pixel data inputted by the original reading unit 101 is white data. In the WTHR register 201, a white pixel determination level is stored for R signal level of pixel inputted from the original reading unit 101. Similarly, in the WTHG register 202, a white pixel determination level is stored for G signal level; and in the WTHB register 203, a white pixel determination level is stored for B signal level.

In the BTHR register 204, the BTHG register 205, BTHB register 206, the DRG register 207, the DGB register 208 and the DRB register 209, threshold values are set for determination as to whether or not the pixel data inputted by the original reading unit 101 is black data. In the BTHR register 204, a black pixel determination level is stored for the R signal level of the pixel inputted from the original reading unit 101. Similarly, in the BTHG register 205, a black pixel determination level is stored for the G signal level; and in the BTHB register 206, a black pixel determination level is stored for the B signal level. Further, the DRG register 207 holds a threshold value regarding the absolute value of difference between the R signal level and the G signal level for determination as to pixel data inputted from the original reading unit 101 is black data. Similarly, the DGB resister 208 holds a threshold value regarding the absolute value of difference between the G signal level and the B signal level; and the DRB register 209 holds a threshold value regarding the absolute value of difference between the R signal level and the B signal level.

Color image data read by the original reading unit 101 is compared with the thresholds values in the above resisters by each signal component of pixel. That is, regarding white pixel determination, a comparator 213 compares the R signal level of the input pixel data with the threshold value of the WTHR 201. If the R signal level of the input pixel is greater than the predetermined threshold value, i.e., the value of the WTHR resister 201, the comparator 213 outputs a signal indicating satisfaction of the condition (Hi level). Similarly, a comparator 214 compares the G signal level of the input pixel data with the threshold value of the WTHG register 202, and a comparator 215 compares the B signal level of the input pixel data with the threshold value of the WTHB register 203. If the signal levels are greater than the threshold values of the WTHG register 202 and the WTHB register 203, the comparators 214 and 215 output signals indicating satisfaction of the conditions (Hi level).

Regarding black pixel determination, a comparator 216 compares the R signal level of input pixel data with the threshold value of the BTHR register 204. If the R signal level of the input pixel data is less than the predetermined threshold value, i.e., the value of the BTHR register 204, the comparator 216 outputs a signal indicating satisfaction of the condition (Hi level). Similarly, a comparator 217 compares the G signal level of the input pixel data with the threshold value of the BTHG register 205, and a comparator 218 compares the B signal level of the input pixel data with the BTHB register 206. If the signal levels are less than the threshold values of the BTHG register 205 and the BTHB register 206, the comparators 217 and 218 output signals indicating satisfaction of the conditions (Hi level).

Further, regarding the black pixel determination, comparators 219 to 221 perform determination by the absolute values of difference in the respective R signal level, the G signal level and the B signal level of input pixel data. That is, the subtracter 210 calculates the absolute value of difference between the R signal level and the G signal level of the input pixel data, and the comparator 219 compares the absolute value with a threshold value for the absolute value of difference between the R signal level and the G signal level for black pixel determination, i.e., the threshold value of the DRG register 207. If the result of calculation by the subtracter 210 is less than the value of the DRG 207, the comparator 219 outputs a signal indicating satisfaction of the condition (Hi level). The comparator 220 compares the result of calculation of absolute value of difference between the G signal level and the B signal level of the input pixel data by the subtracter 211 with the threshold value of the DGB register 208 which is the threshold value for the absolute value of difference between the G signal level and the B signal level for black pixel determination. If the result of calculation by the subtracter 211 is less than the threshold value of the DGB register 208, the comparator 220 outputs a signal indicating satisfaction of the condition (Hi level). The comparator 221 compares the result of calculation of absolute value of difference between the R signal level and the B signal level of the input pixel data by the subtracter 211 with the threshold value of the DGB register 209 which is the threshold value for the absolute value of difference between the G signal level and the B signal level for black pixel determination. If the result of calculation by the subtracter 212 is less than the threshold value of the DGB register 209, the comparator 221 outputs a signal indicating satisfaction of the condition (Hi level).

Next, white, black and color pixel determination of input pixel will be described.

A white pixel determination unit 222 performs white pixel determination on input pixel based on the output signals from the comparators 213 to 215. More specifically, if all the outputs from the comparators 213 to 215 are signals indicating satisfaction of the conditions ("Hi level" signals), the white pixel determination unit 222 determines that the input pixel is a white pixel and outputs a determination signal. A white pixel counting unit 227 receives the output from the white pixel determination unit 222 and counts the number of white pixels.

A black pixel determination unit 223 performs black pixel determination on input pixel based on output signals from the comparators 216 to 221. More specifically, if all the outputs from the comparators 216 to 221 are signals indicating satisfaction of the conditions ("Hi level" signals), the black pixel determination unit 223 determines that the input pixel is a black pixel and outputs a determination signal. A black pixel counting unit 232 receives the output from the white pixel determination unit 222 and counts the number of black pixels.

A color pixel determination unit 224 performs color pixel determination by referring to the output signals from the white pixel determination unit 222 and the black pixel determination unit 223. That is, if both of the outputs from the white pixel determination unit 222 and the black pixel determination unit 223 are not signals indicating satisfaction of the conditions (Hi level), the color pixel determination unit 224 determines that the input pixel is a color pixel, and outputs a determination signal. A color pixel counting unit 229 receives the output from the color pixel determination unit 224 and counts the number of color pixels.

Next, pixel attribute classification on pixel of interest will be described.

The results of determination by the white pixel determination unit 222, the black pixel determination unit 223 and the color pixel determination unit 224 are inputted into a small window processing unit 225 and a large window processing unit 226. The small window processing unit 225 and the large window processing unit 226 are connected to a memory 233 which has a capacity for the number of pixels in a main-scanning direction corresponding to 2 bits per one input pixel.

Figure 3:
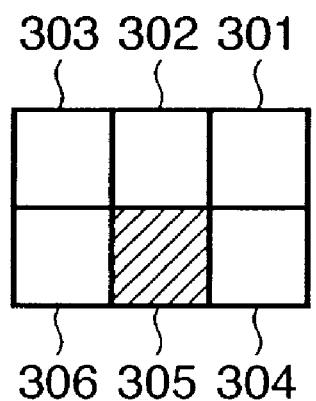
FIG. 3 is a schematic diagram showing a window structure in a small window processing unit.
Figure 4:
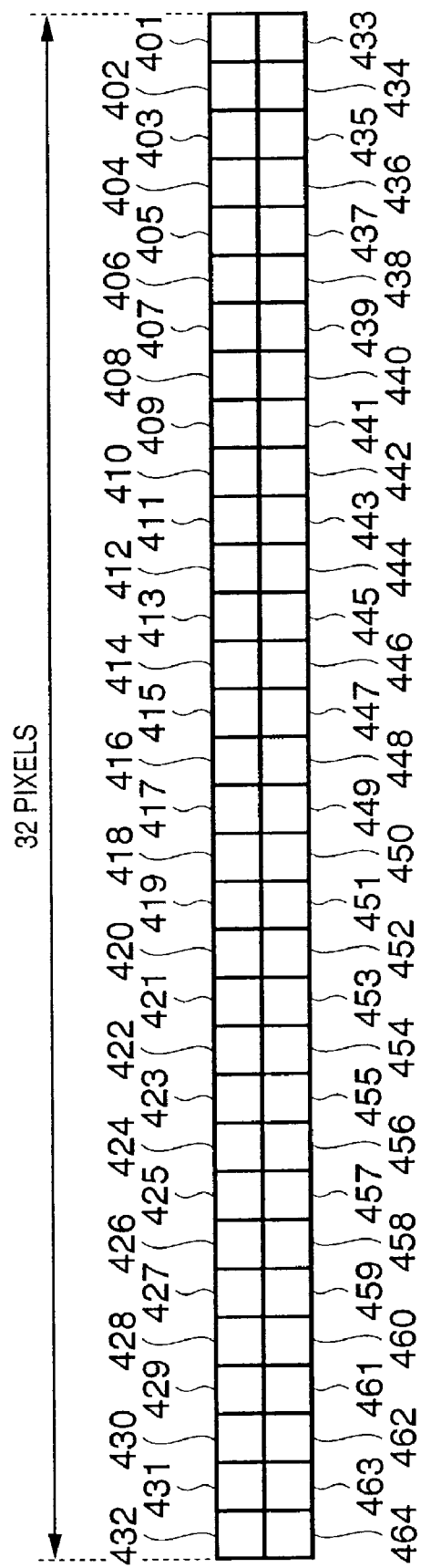
FIG. 4 is an explanatory diagram showing the window structure in a large window processing unit.

FIGS. 3 and 4 show the structures of the small window processing unit 225 and the large window processing unit 226. Hereinbelow, the small window processing unit 225 has a window size of 3 pixels in the main-scanning direction and 2 pixels in the subscanning direction. The large window processing unit 226 has a window size of 32 pixels in the main-scanning direction and 2 pixels in the subscanning direction.

In FIG. 3, numerals 301 to 306 denote registers comprising shift registers for storing the results of determination about input pixel. At the timing of input of pixel data, stored data for each line is shifted to a subsequent register. That is, when pixel data is inputted, the stored data in the register 301 is stored into the register 302, and the stored data in the register 304 is stored into the register 305. As in the case of FIG. 3, in FIG. 4, numerals 401 to 464 denote registers holding the results of determination about input pixel, and stored data for each line is shifted to a subsequent register at the timing of input of pixel data. That is, when pixel data is inputted, the stored data in the register 401 is stored into the register 402, and the stored data in the register 433 is stored into the register 434. Further, the result of determination about a previous line is stored from the memory 233 into the registers 301 and 401, and the result of determination of the input pixel is stored into the register 304 and 433.

The pixel attribute determination about pixel of interest by the small window processing unit 225 and the large window processing unit 226 is respectively performed based on the result of determination about each pixel of previous line and the result of pixel determination about current read line, as shown in FIGS. 3 and 4.

Once the determination result data read from the memory 233 is stored into the register 301 and the register 401, the data is unnecessary. Then, the result of determination of the input pixel is stored in the address of the memory 233 where the determination result data has been stored. Accordingly, the memory 233 for storing the result of determination of previous line may have a capacity for the number of pixels in the main-scanning direction corresponding to 1 line of the input original image data.

Further, the data stored in the registers 301 to 306, the registers 401 to 464 and the memory 233 are initialized to the result of white pixel determination by original image or by line of original image. Further, in FIG. 3, the register 305 (solid black portion in the figure) corresponds to the determination data on the pixel of interest as the object of determination.

If a pixel inputted into the small window processing unit 225 and the large window processing unit 226 is a white pixel, the small window processing unit 225 and the large window processing unit 226 store 2-bit data indicating that the input pixel is a white pixel into the registers in FIGS. 3 and 4. In the present embodiment, the data indicating that the input pixel is a white pixel is "11".

If the input pixel is a black pixel, the small window processing unit 225 and the large window processing unit 226 store 2-bit data indicating that the input pixel is a black pixel into the registers. In the present embodiment, the data indicating that the input pixel is a black pixel is "00".

If the input pixel is a color pixel, the small window processing unit 225 and the large window processing unit 226 store 2-bit data indicating that the input pixel is a color pixel into the registers. In the present embodiment, the data indicating that the input pixel is a color pixel is "10".

Next, processing in an edge color counting unit 228 will be described. The edge color counting unit 228 detects color pixels accompanying a black character by the small window processing unit 225 and counts the number of color pixels. More particularly, when pixel data is inputted into the small window processing unit 225, if the data "10" indicating the determination of color pixel is stored in the register 305 for the pixel of interest and the determination of black pixel is made in any of the peripheral pixels of the pixel of interest, i.e., the data "00" indicating the determination of black pixel is stored in any of the registers 301 to 304 and 306, the small window processing unit 225 outputs a signal to the edge color counting unit 228. The edge color counting unit 228 receives the output signal and counts the number of edge colors.

Next, processing in a V color counting unit 230 will be described. The V color counting unit 230 detects color vertical lines by the large window processing unit 226 and counts the number of vertical lines. More particularly, when pixel data is inputted into the large window processing unit 226, if vertically continuous registers hold the data "11" indicating the determination of color pixel (e.g., registers 416 and 448) among the registers except the both end registers (registers 401, 432, 433 and 464) and if there is no register which holds the data "00" indicating the determination of black pixel among all the registers including the both end registers, the large window processing unit 226 outputs a signal to the V color counting unit 230. The V color counting unit 230 receives the output signal and counts the V colors.

Further, the H color counting unit 231 detects color pixels in a wide area by the large window processing unit 226 and counts the color pixels. More particularly, when pixel data is inputted into the large window processing unit 226, if the data "10" indicating the determination of color pixel is stored in all the registers, the large window processing unit 226 outputs a signal to the H color counting unit 231. The H color counting unit 231 receives the output signal and counts the H colors.

The CPU 103 determines by using the results of counting by the respective counting units in the pixel attribute determination unit 102 whether or not the predetermined area is a monochrome image or color image. In the present embodiment, an area for subscanning directional 64 lines is handled as 1 band, and determination is performed by band. Note that in the present invention, the determination band unit is not limited to the subscanning directional 64 lines but the band unit may be a wider area of lines more than 64 lines or a narrow area of lines less than 64 lines.

Figure 5A:
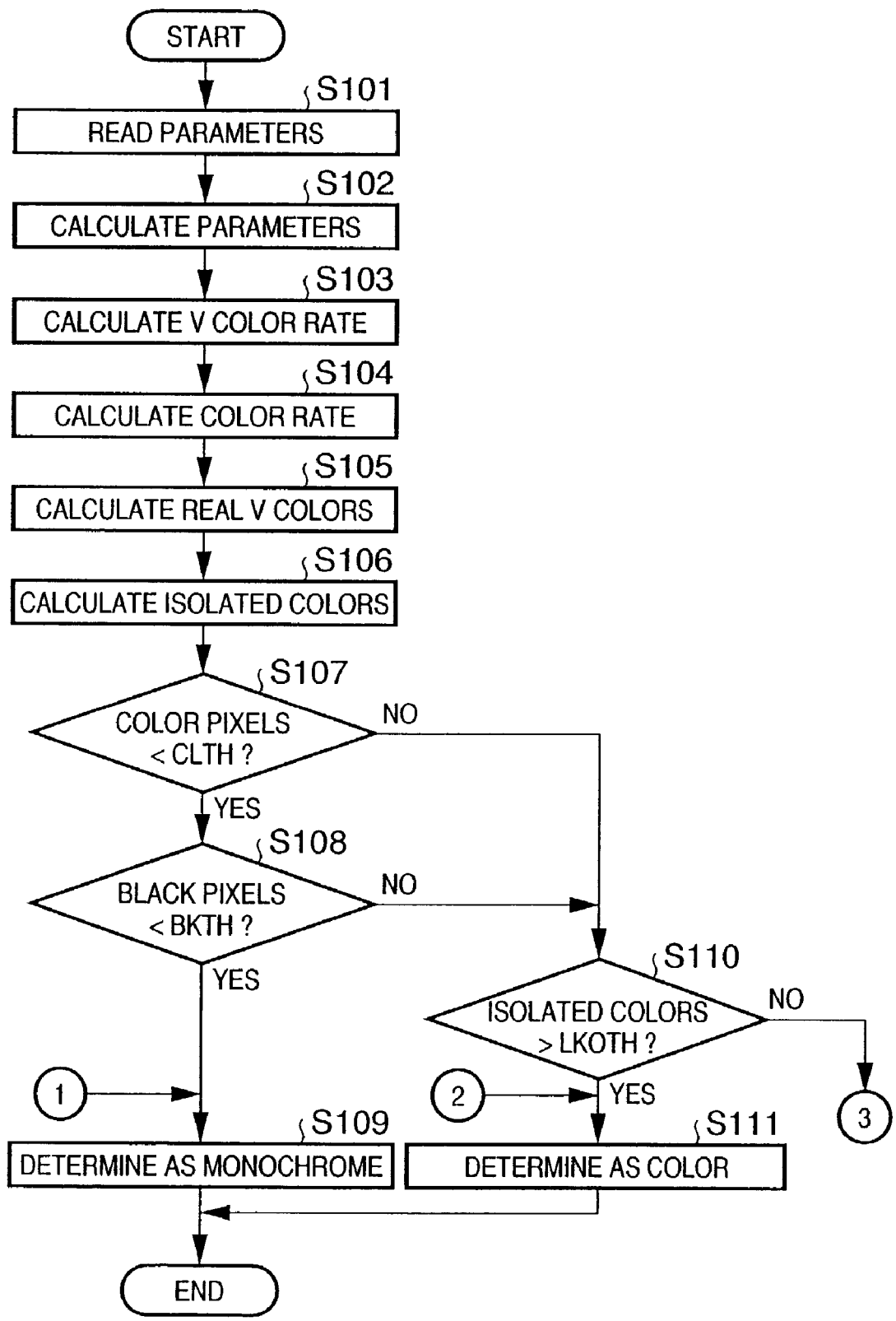
FIGS. 5A and 5B are flowcharts showing attribute determination processing in ½ band units.
Figure 5B:
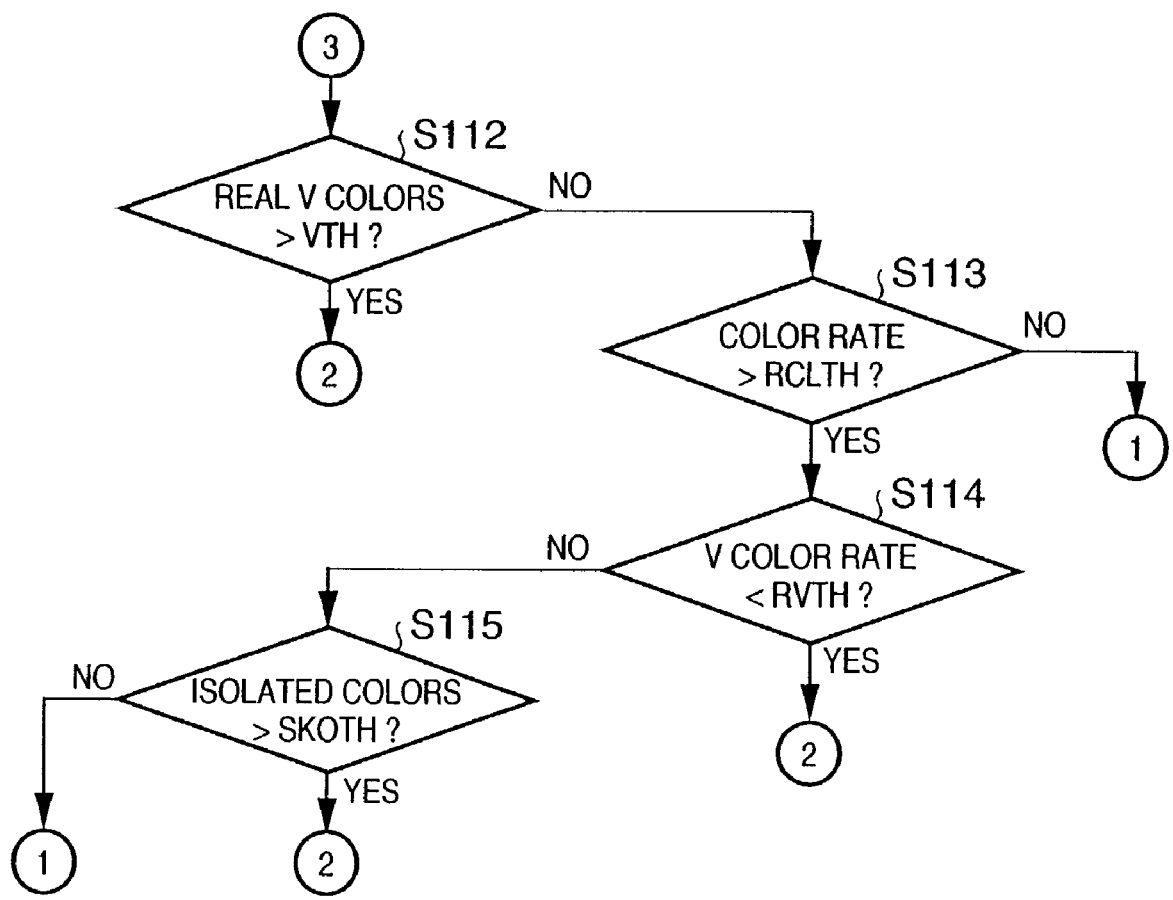

FIGS. 5A and 5B are flowcharts showing determination processing in band units by the CPU 103. At step S101, when the respective counting units of the pixel attribute determination unit 102 have completed counting for ½ of 64 lines constructing the band, i.e., 32 lines, the CPU 103 reads the count values and resets the values of the respective counting units. That is, in the present embodiment, the respective counting units are initialized at the timing of completion of counting for 32 lines. Note that the memory 104 holds the count values for previous 32 lines of the currently counted values. The timing of reading of count values in the present invention is not limited to the ½ of the lines of band.

At step S102, the count values for the previous 32 lines stored in the memory 104 are added to the count values for the current 32 lines read from the respective counting units, thereby the numbers of black, white and color pixels for 64 lines are calculated. Note that after the completion of the calculation, the count values for the current 32 lines are stored into the memory 104.

Next, at step S103, the following calculation is performed based on the V color count value and the edge color count value.

$$(v\ \text{color rate}) = (\text{number of } V \text{ colors})/(\text{number of edge colors}) \quad (1)$$

A band in which the V color rate is close to "1" can be regarded as a character area.

At step S104, the following calculation is performed based on the color pixel count value and the black pixel count value.

$$(\text{color rate}) = (\text{number of color pixels})/(\text{number of black pixels}) \quad (2)$$

A band in which the color rate is high can be regarded as a wide area of color image.

At step S105, the following calculation is performed based on the V color count value and the edge color count value.

$$(\text{number of real } V \text{ colors}) = (\text{number of } V \text{ colors}) - k \cdot (\text{number of edge colors}) \quad (3)$$

The coefficient k may be set to an arbitrary value. Statistically, in a black character area, the rate of edge color is 0.3 to the V colors, accordingly, in the present embodiment, k=0.3 holds. The present invention is not limited to this coefficient value. In a case where the amount of color shift which occurs in a reading device is large, color pixels accompanying a black image are determined as V colors and edge colors. Accordingly, "real V color" means a V color not accompanying a black image.

At step S106, the following calculation is performed based on the color pixel count value, the V color count value and the edge color count value.

$$(\text{number of isolate colors}) = (\text{number of color pixels}) - m \cdot (\text{number of } V \text{ colors}) - (\text{number of edge colors}) \quad (4)$$

The coefficient m may be set to an arbitrary value. To adjust the number of V colors to the size of large window, m=1/32 holds in the present embodiment. The present invention is not limited to this value. In this manner, by subtracting the number of V colors and the number of edge colors from the number of color pixels, color pixels not accompanying black image are represented as isolated colors.

The CPU 103 performs calculations by the expressions (1) to (4) based on the count values of the respective counting units for 32 lines, thereby obtains determination factors for determination about 64 lines. Then the CPU 103 performs attribute determination on the 64 lines (1 band) by using the determination factors as follows.

First, if the number of color pixels is less than a predetermined value CLTH (YES at step S107) and the number of black pixels is less than a predetermined value BKTH (YES at step S108), it is determined that the current band is a monochrome image (S109) since a band with small number of black pixels and color pixels can be considered as a background area.

On the other hand, if NO at step S107 or NO at step S108 and the number of isolated colors is greater than a predetermined value LKOTH (YES at step S110), it is determined that the current band image is a color image since the number of color pixels not accompanying black is large (S111).

Further, if YES at step S110 and the number of real V colors is greater than a predetermined value VTH (YES at step S112), it is determined that the current band is a color image since it is considered that a color line has been detected.

If NO at step S112 and the color rate is greater than a predetermined value RCLTH (YES at step S113), and the V color rate is less than a predetermined value RVTH (YES at step S114), it is determined that the current band is a color image since it is considered that a screened dot image has been detected.

If NO at step S114 and the number of isolated colors is greater than a predetermined value SKOTH (YES at step S115), it is determined that the current band is a color image. Further, if NO at step S115, it is determined that the current band is a monochrome image. That is, regarding a band where the attribute has not been determined at the previous steps, it is determined that the band is a color image if the number of color pixels not accompanying black is large.

As described above, in the present embodiment, color/monochrome attribute determination is performed in band (64 lines) units. Further, the present embodiment is characterized in that final determination processing is performed by using the result of determination in band units. Hereinbelow, the final determination processing will be described with reference to FIG. 6.

In the present embodiment, as described above, the determination factors for 64 lines are calculated based on the count values of the respective counting units read by the CPU 103 by 32 lines and the results of calculations by the expressions (1) to (4), and the determination factors are used in the determination processing shown in FIG. 5, thereby color/monochrome attribute determination is made by 64 lines.

Figure 6A:
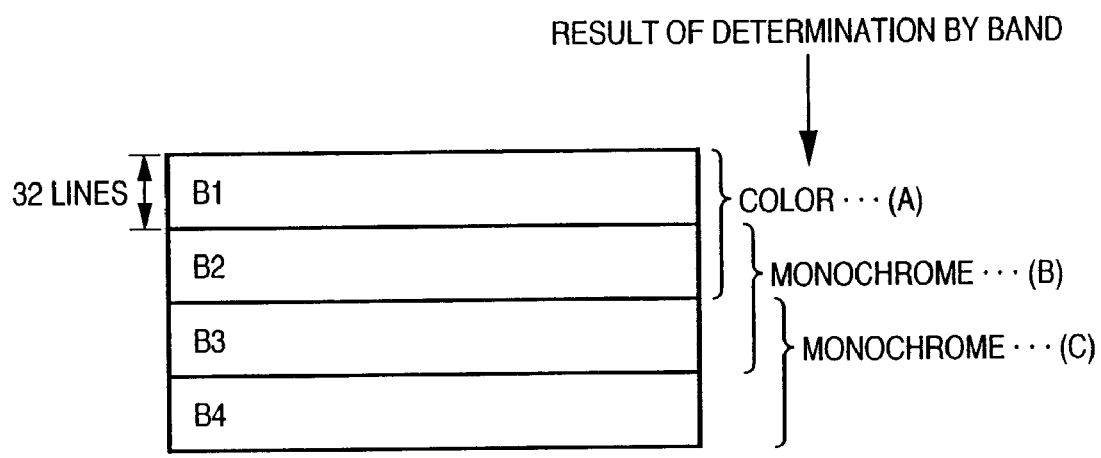
FIGS. 6A and 6B are schematic diagrams showing examples of final attribute determination processing in ½ band units.

FIG. 6A shows an example where the band of 64 lines is constructed by using data areas B1 to B4 each having 32 lines. In the figure, the 64 line data (band A) constructed with the areas B1 and B2 is determined as a color area by the determination processing in FIGS. 5A and 5B. Similarly, the 64 line data (band B) constructed with the areas B2 and B3 is determined as a monochrome area; and the 64 line data (band C) constructed with the areas B3 and B4 is determined as a monochrome area.

Hereinbelow, the final determination about the data in FIG. 6A will be described. In the present embodiment, the final determination is performed not only by the above-described determination by 64 lines, but by using the results of determination about 2 bands constructed with 64 lines, on an area for 32 lines where the results of determination about the 2 bands overlap with each other. That is, the final determination is performed on the 32 line area B2 based on the result of determination about the band A and the result of determination about the band B. Similarly, the final determination is performed on the 32 lines area B3 based on the result of determination about the band B and the result of determination about the band C. More particularly, only if the determination of monochrome area is made in the determination about previous and subsequent 64 lines including 32 line data of final determination, the final determination is made as a monochrome area.

Figure 6B:
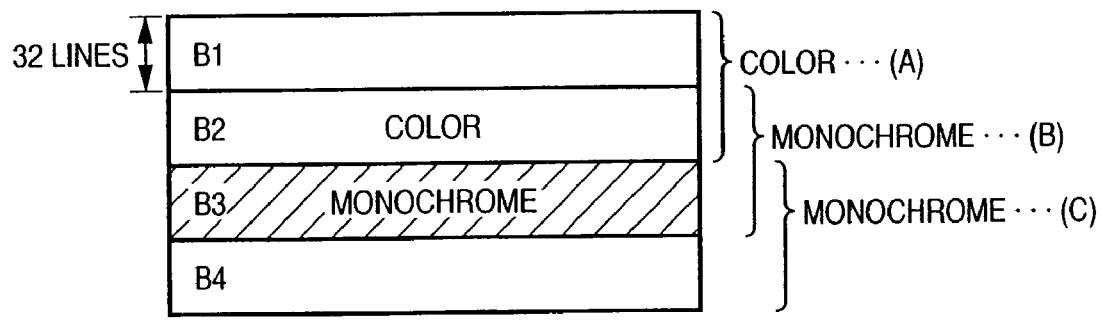

FIG. 6B shows the result of the final determination about the example in FIG. 6A. In this example, as the band A is determined as a color area and the band B is determined as a monochrome area, the area B2 is finally determined as a color area. Further, as the band B and the band C are determined as monochrome areas, the area B3 is finally determined as a monochrome area.

Note that as the CPU 103 merely outputs a signal indicating that the area is a monochrome image or color image, the CPU outputs 1 bit data as the determination result signal. More particularly, if the area is a monochrome image, the CPU outputs a "Hi level" signal, while if the area is a color image, outputs a "Low level" signal. The determination result signal outputted from the CPU 103 is used by the image processing unit 105 in high quality image processing. For example, regarding a pixel determined as a black pixel, it is determined that the pixel belongs to a black character area, and image processing appropriate for character area is performed. On the other hand, regarding a pixel not determined as a black pixel, image processing appropriate for e.g. photographic area is performed.

Note that in the present invention, the attribute determination in band units is performed as software operation in the CPU 103, however, the determination in band units may be realized by hardware.

Further, in the present embodiment, the respective threshold values used in the attribute determination are arbitrarily changed in correspondence with e.g. apparatus process operation mode.

As described above, according to the present embodiment, the determination of monochrome image or not can be appropriately made with a simple construction. Accordingly, when color duplication is performed in an ink-jet type image forming apparatus, as printing by a Bk head longer than a color head can be performed on a band determined as a monochrome image, the printing speed can be further improved in comparison with a case using only the color head.

Further, as an area determined as a monochrome image is not handled as color data, the amount of data sent to the subsequent image processing unit or the like can be reduced, and the printing speed can be improved.

Further, the invention prevents the conventional problem that a monochrome image of black character or the like is processed as a color image by color shift in an original reading device.

Further, as a black character can be printed by using not color ink but black ink, the quality of the black character can be improved.

<Other Embodiment>

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can be also achieved by providing a storage medium (or recording medium) holding software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiment, and the storage medium holding the program code constitutes the invention. Furthermore, besides aforesaid functions according to the above embodiment are realized by executing the program code which is read by a computer, the present invention includes a case where an OS (operating system) or the like working on the computer performs a part or entire actual processing in accordance with designations of the program code and realizes functions according to the above embodiment.

Furthermore, the present invention also includes a case where, after the program code is written in a function expansion card which is inserted into the computer or in a memory provided in a function expansion unit which is connected to the computer, a CPU or the like contained in the function expansion card or unit performs a part or entire actual processing in accordance with designations of the program code and realizes the functions of the above embodiment.

As described above, according to the present invention, appropriate attribute determination can be performed on image data in predetermined band units with a simple construction.

Further, as the attribute determination is appropriately performed on image data in the predetermined band units, high quality image formation is realized.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:
input means for inputting a luminance signals of pixels which are components of a color multi-value image;
color attribute determination means for determining whether each pixel in the color multi-value image is white, black or color on the basis of a luminance signal of the pixel and outputting a determination result;
storage means for storing the color attribute of the pixels which are included in two lines in the color multi-value image;
first counting means comprising first, second and third window counting means, wherein
said first window counting means counts the number of first windows including a color pixel of interest and at lease one black pixel around the pixel of interest, where each first window has a size of 2×n pixels set on the two lines,
said second window counting means counts the number of second windows that include no black pixel and that include two color pixels that are continuous in a vertical direction except both end four pixels in the window, where each second window has a size of 2×m (where m>n) pixels set on the two lines, and
said third window counting means counts the number of third windows, where each third window has only color pixels in the second window;
second counting means for counting the number of the first, second and third windows in a first band area including a plurality of lines in the color multi-value image;
calculation means for calculating a parameter indicating an image attribute of a second band area, whose size is two times that of the first band area, on the basis of results provided by said first and second counting means;

attribute determination means for determining an image attribute of the second band area on the basis of the results provided by said first and second counting means and the parameter calculated by said calculation means; and final determination means for determining an image attribute of a third band area on the basis of the image attributes of two second band areas, where the third band area is an area of overlap of two second band areas and is the same size as the first band area.

2. The image processing apparatus according to claim 1, wherein said color attribute determination means determines whether or not the pixel is a white pixel by comparing the luminance signal with a predetermined threshold value.

3. The image processing apparatus according to claim 1, wherein said color attribute determination means determines whether or not the pixel is a black pixel, based on the result of comparison between the luminance signal and a predetermined threshold value and the result of comparison between a difference value between color components of the luminance signal and a predetermined threshold value.

4. The image processing apparatus according to claim 1, wherein if said color attribute determination means determines that the pixel is not a white pixel and that the pixel is not a black pixel, said color attribute pixel determination means determines that the pixel is a color pixel.

5. The image processing apparatus according to claim 1, wherein said second counting means comprises:
means for, counting pixels determined as white pixels by said color attribute determination means and thereby obtaining a white pixel count value;
means for counting pixels determined as black pixels by said color attribute determination means and thereby obtaining a black pixel count value; and
means for counting pixels determined as color pixels by said color attribute determination means and thereby obtaining a color pixel count value.

6. The image processing apparatus according to claim 5, wherein said calculation means comprises:
first calculation means for calculating a ratio between the number of the first windows and the number of the second windows and thereby obtaining a first parameter;
second calculation means for calculating a ratio between the color pixel count value and the black pixel count value and thereby obtaining a second parameter;
third calculation means for subtracting a predetermined multiple of the number of first windows from said the number of second windows and thereby obtaining a third parameter; and
fourth calculation means for subtracting a predetermined multiple of the number of second window and further subtracting the number of first windows from the color pixel count value, and thereby obtaining a fourth parameter.

7. The image processing apparatus according to claim 1, wherein said line attribute determination means determines the image attribute of the second band area by comparing the count values by said first and second counting means and the parameter calculated by said calculation means with predetermined threshold values.

8. The image processing apparatus according to claim 1, wherein said attribute determination means determines the image attribute of the second band area as monochrome or not,
and wherein if the image attribute of a third band area included in adjacent second band areas is determined as monochrome, said final determination means determines the image attribute of the third band area as monochrome.

9. The image processing apparatus according to claim 1, wherein the number of lines of the first band area and that of the third band area are the same.

10. The image processing apparatus according to claim 9, wherein the number of lines of the first band area is the half of that of the second band area.

11. The image processing apparatus according to claim 1, further comprising image processing means for performing image processing on the third band area in correspondence with the image attribute of the third band area determined by said final determination means.

12. The image processing apparatus according to claim 1, further comprising image printing means for performing image printing in units of a predetermined number of lines, wherein the predetermined number of lines correspond to the number of lines of the third band area.

13. The image processing apparatus according to claim 12, wherein said image printing means comprises an ink-jet type monochrome head and an ink-jet type color head, and wherein said monochrome head is longer than said color head.

14. A storage medium holding the program according to claim 12.

15. An image processing method comprising:
an input step, of inputting a luminance signals of pixels which are components of a color multi-value image;
a color attribute determination step, of determining whether each pixel in the color multi-value image is white, black or color on the basis of a luminance signal of the pixel and outputting a determination result;
a storage step, of storing the color attribute of the pixels which are included in two lines in the color multi-value image;
a first counting step, comprising first, second and third window counting steps, wherein
said first window counting step is a step, of counting the number of first windows including a color pixel of interest and at lease one black pixel around the pixel of interest, where each first window has a size of 2×n pixels set on the two lines,
said second window counting step is a step of counting the number of second windows that include no black pixel and that include two color pixels that are continuous in a vertical direction except both end four pixels in the window, where each second window has a size of 2×m (where m>n) pixels set on the two lines, and
said third window counting step is a step of counting the number of third windows, where each third window has only color pixels in the second window;
a second counting step, of counting the number of the first, second and third windows in a first band area including a plurality of lines in the color multi-value image;
a calculation step, of calculating a parameter indicating an image attribute of a second band area, whose size is two times that of the first band area, on the basis of results provided by said first and second counting steps;
an attribute determination step, of determining an image attribute of the second band area on the basis of the results provided by said first and second counting steps and the parameter calculated in said calculation step; and a final determination step, of determining an image attribute of a third band area on the basis of the image attributes of two second band areas, where the third band area is an area of overlap of two second band areas and is the same size as the first band area.

16. A program, stored in a computer-readable medium, executable by a computer to cause the computer to operate as an image processing apparatus, said program comprising:

an input step, of inputting a luminance signals of pixels which are components of a color multi-value image;

a color attribute determination step, of determining whether each pixel in the color multi-value image is white, black or color on the basis of a luminance signal of the pixel and outputting a determination result;

a storage step, of storing the color attribute of the pixels which are included in two lines in the color multi-value image;

a first counting step, comprising first, second and third window counting steps, wherein said first window counting step is a step, of counting the number of first windows including a color pixel of interest and at lease one black pixel around the pixel of interest, where each first window has a size of 2×n pixels set on the two lines, said second window counting step is a step of counting the number of second windows that include no black pixel and that include two color pixels that are continuous in a vertical direction except both end four pixels in the window, where each second window has a size of 2×m (where m>n) pixels set on the two lines, and said third window counting step is a step of counting the number of third windows, where each third window has only color pixels in the second window;

a second counting step, of counting the number of the first, second and third windows in a first band area including a plurality of lines in the color multi-value image;

a calculation step, of calculating a parameter indicating an image attribute of a second band area, whose size is two times that of the first band area, on the basis of results provided by said first and second counting steps;

an attribute determination step, of determining an image attribute of the second band area on the basis of the results provided by said first and second counting steps and the parameter calculated in said calculation step; and a final determination step, of determining an image attribute of a third band area on the basis of the image attributes of two second band areas, where the third band area is an area of overlap of two second band areas and is the same size as the first band area.

* * * * *

UNITED STATES PATENT AND TRADEMARK OFFICE
CERTIFICATE OF CORRECTION

PATENT NO. : 7,145,693 B2
APPLICATION NO. : 10/212156
DATED : December 5, 2006
INVENTOR(S) : Hidetsugu Kagawa It is certified that error appears in the above-identified patent and that said Letters Patent is hereby corrected as shown below:

COLUMN 1

Line 50, "signals" should read --signal--; and
Line 60, "lease" should read --least--.

COLUMN 3

Line 37, "resister" should read --register--;
Line 43, "resisters" should read --registers--; and
Line 49, "resister" should read --register--.

COLUMN 7

Line 49, "isolate" should read --isolated--.

COLUMN 8

Line 65, "lines" should read --line--.

COLUMN 10

Line 33, "a luminance signals" should read --luminance signals--; and
Line 46, "lease" should read --least--.

COLUMN 11

Line 48, "said" should be deleted; and
Line 52, "window" should read --windows--.

COLUMN 12

Line 26, "claim 12." should read --claim 16.--;
Line 28, "a luminance signals" should read --luminance signal--; and
Line 41, "lease" should read --least--.

UNITED STATES PATENT AND TRADEMARK OFFICE
CERTIFICATE OF CORRECTION

PATENT NO. : 7,145,693 B2
APPLICATION NO. : 10/212156
DATED : December 5, 2006
INVENTOR(S) : Hidetsugu Kagawa It is certified that error appears in the above-identified patent and that said Letters Patent is hereby corrected as shown below:

COLUMN 13

Line 9, "a luminance signals" should read --luminance signals--; and
Line 22, "lease" should read --least--.

Signed and Sealed this

Fifteenth Day of January, 2008

JON W. DUDAS
*Director of the United States Patent and Trademark Office*